United States Patent [19]

Avidan et al.

[11] Patent Number: 5,728,358
[45] Date of Patent: Mar. 17, 1998

[54] SOX SORBENT REGENERATION

[75] Inventors: Amos A. Avidan, Yardley, Pa.; Nazeer A. Bhore, Wilmington, Del.; J. Scott Buchanan, Hamilton, N.J.; David L. Johnson, Glen Mills, Pa.; Khushrav E. Nariman, Lawrenceville; David L. Stern, Princeton, both of N.J.

[73] Assignee: Mobil Oil Corporation, Fairfax, Va.

[21] Appl. No.: 723,373

[22] Filed: Sep. 30, 1996

Related U.S. Application Data

[63] Continuation of Ser. No. 278,526, Jul. 20, 1994, abandoned, which is a continuation-in-part of Ser. No. 63,473, May 19, 1993, abandoned, which is a continuation of Ser. No. 868,432, Apr. 15, 1992, Pat. No. 5,229,091.

[51] Int. Cl.⁶ .................................. B01J 8/00; C01B 7/00
[52] U.S. Cl. .................................. 423/244.01; 423/244.02; 423/244.07; 423/541.1; 423/569
[58] Field of Search .................. 423/244.1, 244.02, 423/244.08, 244.12, 243.12, 569, 541.1, 578.4

[56] References Cited

U.S. PATENT DOCUMENTS

| | | |
|---|---|---|
| 3,832,445 | 8/1974 | Kouwenhoven et al. ............... 423/244 |
| 4,039,478 | 8/1977 | Cull et al. ............................ 252/455 R |
| 4,059,418 | 11/1977 | Cull ........................................... 55/73 |
| 4,152,400 | 5/1979 | Gernand et al. ......................... 423/244 |
| 4,164,546 | 8/1979 | Welty, Jr. et al. ....................... 423/239 |
| 4,187,282 | 2/1980 | Matsuda et al. ......................... 423/244 |
| 4,692,318 | 9/1987 | Tolpin et al. ............................ 423/239 |
| 4,790,982 | 12/1988 | Yoo et al. ................................ 423/239 |
| 4,829,036 | 5/1989 | Nelson et al. ............................. 502/50 |
| 5,229,091 | 7/1993 | Buchanan et al. .................. 423/244.01 |

FOREIGN PATENT DOCUMENTS

WO87/06156 10/1987 WIPO.

*Primary Examiner*—Gary P. Straub
*Attorney, Agent, or Firm*—Penny L. Prater; Malcolm D. Keen

[57] ABSTRACT

There is provided a process directed to the use of gases containing or mixed with carbon monoxide, such as synthesis gas, to aid in the regeneration of sulfur oxide-sorbed solid oxides, such as magnesium aluminates or spinels. This process is especially useful in applications where the solid oxide is used to purify the flue gas stream from an FCC regenerator, coal or oil-fired plant, power plant or process heat furnace, or the tail gas from a Claus plant. The process is also useful to remove sulfur oxides from flue gases produced in solid fuel combusters. According to this invention, carbon monoxide may be used alone or in combination with other gases to make the regeneration of the solid oxide exothermic or less endothermic, thereby improving the effectiveness of the regeneration.

6 Claims, No Drawings

SOX SORBENT REGENERATION

CROSS REFERENCE TO RELATED APPLICATIONS

This is a continuation of application Ser. No. 08/278,526, filed on Jul. 20, 1994 now abandoned, which is a Continuation-in-Part of U.S. application Ser. No. 08/063,473, filed May 19, 1993, now abandoned, incorporated herein by reference in its entirety, which itself is a continuation of U.S. application Ser. No. 07/868,432, filed Apr. 15, 1992, now U.S. Pat. No. 5,229,091, issued Jul. 20, 1993.

FIELD OF THE INVENTION

The present invention is directed to the use of reducing gases containing carbon monoxide or synthesis gas to aid in the regeneration of sulfur oxide-sorbed solid oxides, such as magnesium aluminates or spinels, especially in applications where the $SO_x$ sorbent is used to purify the flue gas stream from an FCC regenerator, coal or oil-fired plant or process heat furnace, or the tail gas from a Claus plant. The present invention is also useful in solid fuel combustors.

BACKGROUND OF THE INVENTION

Petroleum refinery streams are typically desulfurized by the Claus process. In the Claus process, elemental sulfur is produced by reacting $H_2S$ and $SO_2$ in the presence of a catalyst. The Claus system uses a combustion chamber which, at 950°–1,350° C., converts 50 to 70% of sulfur contained in the feed gas into elemental sulfur. Sulfur is condensed by cooling the reaction gas to a temperature below the dew point of sulfur, after which the remaining gas is heated and further reacted over a catalyst. Normally, the gas passes through at least two such Claus catalyst stages.

The different stages of the Claus process may be represented by the following equations:

$$H_2S + 3/2\ O_2 \rightarrow SO_2 + H_2O \qquad (I)$$

$$2\ H_2S + SO_2 \rightarrow 3\ S_n + 2\ H_2O \qquad (II)$$

The overall reaction is:

$$3\ H_2S + 3\ O_2 \rightarrow 3\ S_n + 3\ H_2O \qquad (III)$$

Below 500° C., the symbol n has a value of approximately 8.

The final Claus exhaust gas still contains small amounts of $H_2S$, $SO_2$, $CS_2$, COS, CO, and elemental sulfur in the form of a vapor or mist. The exhaust gas can be subjected to post-combustion to convert substantially all sulfur species to sulfur oxides, for example, $SO_2$ and $SO_3$, which are then emitted into the atmosphere.

Sulfur emitted as sulfur oxides ("$SO_x$") into the atmosphere with the exhaust gas may amount to 2–6% of the sulfur contained in the feed gas in the form of $H_2S$. In view of air pollution and the loss of sulfur involved, further purification is desirable.

Claus aftertreatments have been developed. These are carried out after the last Claus stage or after the post-combustion. These aftertreatments include, for example, dry and liquid phase processes for catalytic conversion of $H_2S$ and $SO_2$ to elemental sulfur, catalytic hydrogenation and hydrolysis of sulfur compounds into $H_2S$ for further processing, and oxidation of all sulfur compounds into $SO_x$ for further processing by sorption in dry processes or absorption in wet processes.

SUMMARY OF THE INVENTION

The catalytic functioning of dry solid oxides for applications involving the reduction of sulfur oxides to elemental sulfur and/or $H_2S$, or the concentration of sulfur oxides for subsequent reaction in a downstream Claus unit may be broadly typified by the reaction scheme illustrated below.

$$\text{Solid oxide} + SO_2 + 1/2\ O_2 \rightarrow \text{Solid oxide.}SO_3 \qquad (IV)$$

$$\text{Solid oxide.}SO_3 + \text{Reducing Gas} \rightarrow \text{Removed Sulfur Species} + \text{"Reduced Solid oxide"} \qquad (V)$$

$$\text{"Reduced Solid oxide"} + O_2 \rightarrow \text{Solid oxide} \qquad (VI)$$

Reaction IV indicates the oxidative reaction of $SO_2$, which is thought to occur via the oxidation of sulfur oxide mixtures (i.e., $SO_2$ and $SO_3$) and the combination of the $SO_3$, with the solid oxide on the catalyst. In the open literature, this has been called "Catalyst Sulfation," and after the combination with the solid oxide, the sulfur oxide-containing material is commonly called a "Sulfated Catalyst." As used herein, "sulfation" is intended to refer both to chemisorption, such as would include sorption or $SO_3$, and physisorption, such as might be depicted $M.SO_3$, where M is the sorbent.

Reaction V involves the reduction or regeneration of the so called sulfated catalyst. The sulfur oxides are released primarily as a mixture of $SO_2$, elemental sulfur, $H_2S$, and other sulfur containing compounds. The reaction also leads to a solid oxide which reacts with oxygen and thus is termed a "Reduced Solid Oxide." A partial list of gases considered as reductants are hydrogen containing streams (e.g., steam reformer or naphtha reformer hydrogen, catalytic hydrogenation unit purge streams, etc.), and hydrocarbons such as propane and ethane.

Reaction VI represents the oxidative calcination of the "Reduced Solid Oxide." It may be the reaction of air or other suitable oxidizing media with the reduced solid oxide, and yields a calcined solid oxide which may undergo more cycles of reactions IV through VI above. If desired, reaction VI may be combined with reaction IV to eliminate one processing step.

Dry adsorption processes have typically experienced limited sulfur oxide loading capability. A process recently disclosed in commonly assigned U.S. Pat. No. 5,229,091 to Buchanan et al., incorporated herein by reference, increases the loading capability of the solid oxide significantly, up to about 60 wt. % $SO_3$ on solid oxide. With this improved dry sulfation and desulfation process, the thermodynamics of the sulfation and desulfation, or regeneration, reactions, equations IV and V above, become increasingly important.

The sulfation reaction is typically exothermic, but, because the reactant concentration in the sulfation step typically is low, the adiabatic temperature rise is typically moderated by the large heat capacity of the inert components in the feed gases.

One potential obstacle in the design and practice of processes for dry $SO_x$ removal from gases as described above is difficulty in the desulfation or regeneration step, equation V. It has been found that the desulfation reaction is frequently endothermic. In the regeneration step, because it is in most cases desirable to process a high concentration of reducing gas reactants, e.g., to reduce the flow of inert gases to downstream processing units, the adiabatic temperature change can be large for even relatively small heats of reaction. With the heat capacity of the solid oxide bed acting as the only significant source or sink of heat, the desulfation of sulfur oxides or regeneration of the solid oxide may be limited by the amount of heat available in the solid oxide. Also, the endothermic reaction may result in quenching of the reaction prior to complete regeneration. In a commercial adiabatic unit, regeneration may be limited by the amount of heat available in the solid oxide. The extent of solid oxide regeneration could therefore depend on the heat of reaction involved. Thus, finding ways to either reduce the endothermicity of the regeneration step or to make this reaction exothermic is highly desirable and may prove to be pivotal in the practice of the overall process.

It is, therefore, an object of the present invention to provide an improved method for gas-solid reactions to remove contaminants such as sulfur oxides from waste gas streams by making the regeneration of the solid oxide (equation V above), exothermic or less endothermic.

An additional object of the present invention is to reduce the time required for regeneration of the solid oxide.

Another object of the present invention is the use of the process in adiabatic operation, where a less endothermic reaction can lead to improved catalyst utilization for $SO_x$ uptake and regeneration.

Another object of the present invention is the concentration of the off-gas stream containing the recovered sulfur oxides to allow additional processing without an intervening concentration step.

In accordance with the present invention, there is provided an improved process for removing low concentrations of sulfur oxides from a gas stream such as Claus plant tail-gas, FCC flue gas, heater and boiler flue gases and combustion off-gases. Through this process, a solid oxide is used to remove sulfur oxides, then said oxide is regenerated with a reducing gas, e.g., carbon monoxide or synthesis gas, which produces an off-gas containing recovered sulfur oxides and a regenerated solid oxide.

This invention involves the use of carbon monoxide or gas streams comprising carbon monoxide to aid in the regeneration of sulfur oxide-containing solid oxides, such as, for example, magnesium aluminates or spinels, especially in applications where the $SO_x$ containing solid oxide is used to purify the flue gas stream from an FCC regenerator, coal or oil fired plant, power plant, process heat furnace, or the tail gas from a Claus plant. This invention is also useful where the solid oxide is used to remove $SO_x$ in a solid fuel combustor, such as would be found in a fluid bed combustor such as a circulating fluid bed boiler or a fixed-fluid bed boiler or even in a hybrid system which has some entrainment, and where the solid oxide is regenerated by reducing gases comprising carbon monoxide.

As a result of the present invention, the removal of contaminants from waste gases using a gas-solid reaction system is significantly improved. This invention uses a reducing gas comprising carbon monoxide to regenerate a sulfur-oxide containing solid oxide to make the regeneration of the solid oxide less endothermic or to make this reaction exothermic. This change in the thermodynamics of the regeneration of the solid oxide allows increased adiabatic regeneration, thus facilitating increased use of the capacity of the solid oxide for $SO_x$ removal. Additionally, the reducing gases of this invention, gases comprising carbon monoxide, including, for example, synthesis gas, can be blended with other gases capable of regenerating the solid oxide, such as, for example, hydrogen, and/or hydrocarbons, to change the thermodynamics of the regeneration of the sulfur oxide-containing solid oxide to make the regeneration exothermic or less endothermic.

An embodiment of the present invention is a regeneration process for a solid oxide comprising at least one metal oxide employed to remove sulfur compounds from a flue gas stream comprising the following steps: (a) terminating contact between the solid oxide and the sulfur containing flue gas; (b) regenerating the solid oxide with a reducing gas comprising carbon monoxide, thereby forming an off-gas and a regenerated solid oxide; (c) terminating contact between the solid oxide and the reducing gas; and (d) contacting the regenerated solid oxide with the sulfur containing flue gas.

Another embodiment of the present invention is a process for removing sulfur oxides from a gas stream comprising: (a) directing the gas stream containing the sulfur oxides and a source of oxygen into an absorber containing a solid oxide operated under conditions sufficient to remove substantially all of the sulfur oxides from the gas stream and to thereby produce a sulfated solid oxide, said solid oxide comprising a metal oxide; (b) regenerating the sulfated solid oxide by terminating contact with the sulfur oxide and oxygen containing gas and contacting the solid oxide, under conditions sufficient to cause the adsorbed sulfur oxides to be released, with a reducing gas to release at least a portion of sulfur compounds from the sulfated solid oxide and to thereby form a regenerated solid oxide and an off-gas containing the released sulfur compounds, said reducing gas selected to yield an exothermic regeneration; and (c) returning the regenerated solid oxide into contact with said gas stream containing sulfur oxides and a source of oxygen.

Yet another embodiment of the present invention is a process where a solid oxide is used to remove sulfur oxides wherein said solid oxide is regenerated with a reducing gas and off gas is passed to a Claus sulfur recovery process comprising: (a) introducing an oxygen containing gas and a tail-gas containing sulfur compounds therein into an incinerator under conditions sufficient to convert substantially all of the sulfur to sulfur oxides; (b) directing the gas containing sulfur oxides produced in step (a) from the incinerator into an absorber containing a solid oxide operated under conditions sufficient to remove substantially all of the sulfur oxides from the gas and to thereby produce a sulfated solid oxide and a substantially sulfur oxide free gas, which sulfur free gas is released from said absorber; (c) ceasing contact between the sulfur oxide containing gas and the solid oxide after the solid oxide has become substantially loaded with said oxides; (d) regenerating the solid oxide by contacting it with a reducing gas comprising carbon monoxide under conditions sufficient to cause at least a portion of the sulfur compounds thereon to be released, thereby forming an off gas comprising at least one of sulfur dioxide, hydrogen sulfide, and elemental sulfur and a regenerated solid oxide, whereby sulfur dioxide, hydrogen sulfide, and elemental sulfur contained in the off gas are in an amount sufficient to be removed by a Claus sulfur recovery process; and (e) directing the off gas into a Claus sulfur recovery process where said off gas is converted substantially to elemental sulfur.

Still yet another embodiment of the present invention is a process where a solid oxide is used in a solid fuel combustion zone to remove sulfur oxides wherein said solid oxide is regenerated with a reducing gas and off gas is passed to a sulfur recovery process comprising: (a) selecting a magnesium aluminate as the solid oxide, said magnesium aluminate further comprising at least one promoter; (b) adding the solid oxide to the combustion zone where solid fuel is combusted and thereby produces a combustion gas and an ash; (c) contacting the combustion gas with the solid oxide at conditions effective to remove substantially all of the sulfur oxides from the combustion gas and to thereby produce a sulfated solid oxide; (d) passing the sulfated solid oxide from the combustion zone; (e) directing at least a portion of the sulfated solid oxide into a regeneration zone; (f) regenerating the sulfated solid oxide in the regeneration zone by contacting it with a reducing gas comprising carbon monoxide under conditions sufficient to allow the sulfur compounds thereon to be released, thereby forming a regenerated solid oxide and an off gas comprising at least one of sulfur dioxide, hydrogen sulfide, elemental sulfur and mixtures thereof, in an amount sufficient to be removed by a sulfur recovery process; (g) adding at least a portion of the regenerated solid oxide into the combustion zone; and (h) directing the off gas into a sulfur recovery process.

An advantage of the present invention is a decrease in the time required for the regeneration of the solid oxide.

Another advantage of the present invention is the concentration of sulfur compounds in the regeneration off-gas stream sufficient to allow additional processing without an intervening concentration step.

DETAILED DESCRIPTION OF THE INVENTION

This invention provides an improved process for reducing sulfur oxides from a waste gas or flue gas stream using a gas-solid reaction system. This invention uses a reducing gas comprising carbon monoxide to regenerate a sulfated solid oxide to make the regeneration of the solid oxide less endothermic or to make this reaction exothermic. The reducing gases of this invention, gases comprising carbon monoxide, including, for example, synthesis gas, can be blended with other gases capable of regenerating the solid oxide, such as, for example, at least one of hydrogen, hydrocarbons, and mixtures thereof, to change the thermodynamics of the regeneration of the sulfated solid oxide to make this regeneration exothermic or less endothermic. This invention is useful in many embodiments.

One process in which this invention is useful is that disclosed in commonly assigned U.S. Pat. No. 5,229,091 to Buchanan et al., incorporated herein by reference. As mentioned earlier, this process increases the loading capability of a solid oxide up to about 60 weight percent $SO_3$ on the solid oxide. The present invention is particularly well adapted to regeneration of the solid oxides disclosed in the Buchanan patent and to be used in that process. In that process, a solid oxide is used to remove sulfur oxides from a gas stream, and then the solid oxide is regenerated with a reducing gas and the resulting off gas is passed to a Claus sulfur recovery process. The sulfur oxide absorption process comprises introducing an oxygen containing gas and a tail gas or flue gas further containing sulfur compounds into an incinerator under conditions sufficient to convert substantially all of the sulfur to sulfur oxides; directing gas with sulfur oxides therein from the incinerator over a solid oxide operated so that substantially all of the sulfur oxides are combined with the solid oxide while a substantially sulfur oxide free gas is released from said solid oxide; ceasing absorption of sulfur oxides on said solid oxide after said solid oxide has become substantially loaded with said oxides; regenerating the solid oxide by contacting it with a reducing gas comprising carbon monoxide under conditions sufficient to cause the sulfur compounds to be released from the solid oxide, thereby forming a regenerated solid oxide and an off gas comprising at least one of sulfur dioxide, hydrogen sulfide, and elemental sulfur, whereby sulfur dioxide, hydrogen sulfide, and elemental sulfur contained in the off gas are in an amount sufficient to be removed by a Claus sulfur recovery process; and directing the off gas into a Claus sulfur recovery process where this gas is converted substantially to elemental sulfur.

The configuration of this invention is flexible. For example, as described above, the untreated gas stream may be directed into an incinerator along with an oxygen source to oxidize all sulfur compounds to sulfur oxides, then directed over the solid oxide. This is a typical mode of operation when processing Claus plant tail-gas. The incinerator is operated to oxidize sulfur compounds to sulfur oxides at typical conditions, for example, typical outlet conditions are about 900° F. to about 2,500° F., about 0.1 to about 10 atmospheres pressure, and about 0.1 to about 10 mol. % excess oxygen, e.g., about 2 to about 4 mol. % excess oxygen, e.g., sufficient oxygen to satisfy the requirements of equations (IV) and (V) as described above (e.g., at least about one-half mole of oxygen per mole of $SO_2$ present). If the incinerator is catalytic, the gas flow rate may be about 400 to about 7,000 $hr^{-1}$ gas hourly space velocity (GHSV). Supplemental fuel may be added to the incinerator to maintain the desired temperature. This supplemental fuel may be any commonly available combustible fuel, e.g., natural gas, refinery or petrochemical fuel gas, solid, gaseous, or liquid hydrocarbons.

Alternatively, if no oxidation of the untreated gas stream is required, the gas stream may be directed to the absorber without a separate incineration step. This would be the typical mode of operation with oxidized flue gas, such as from an FCC regenerator, coal or oil fired plant, process heat furnace or power plant. If there are very low concentrations of oxidizable sulfur compounds in the flue gas, the sulfur compounds may be oxidized by the solid oxide if desired. In both of the above situations (e.g., where oxidation of the gas stream is not required, or where low concentrations of oxidizable sulfur compounds are present in the gas), the incinerator mentioned above and in the above referenced U.S. Pat. No. 5,229,091, may be eliminated and the flue gas stream directed straight to the bed of solid oxide. The solid oxide is operated at conditions effective to absorb the sulfur oxides onto the solid oxide, for example, temperatures of about 400° F. to about 1,800° F., e.g., about 900° to about 1400° F., e.g., about 1000° F. and about 1300° F., about 0.1 to about 10 atmospheres pressure, e.g., about 0.5 to about 5 atmospheres, about 0 to about 4 volume percent excess oxygen, e.g., with an inlet oxidizing agent or oxygen ($O_2$) concentration of at least about one-half mole per mole of $SO_2$ in the vapor stream, and at flow rate sufficient to provide a gas hourly space velocity of about 500 to about 20,000 $hr^{-1}$.

Yet another embodiment of this invention includes the use of this sulfur oxide removal process in a solid fuel combustion zone, such as would be found in a fluid bed combustor such as a circulating fluid bed boiler or a fixed-fluid bed boiler or even in a hybrid system which has some entrainment. In this embodiment, the solid oxide is added, either separately or with the sulfur-containing coal, to the combustion zone, where the solid fuel is combusted to produce a combustion gas and an ash, such as coal ash. The solid oxide circulates through the fluid bed combustor with the other solids that are present, such as coal ash and including any inerts that are used to control flow, mixing and temperature patterns in the combustor. In the combustion zone, the solid oxide contacts the combustion gas to remove sulfur oxides from the combustion gas and thereby become a sulfated solid oxide. After passing through the combustion zone, the sulfated solid oxide is separated from the other coarse solids using well known solids separation techniques, such as screening, density separation or other methods. A portion of the sulfated solid oxide may be directly returned to the combustion zone, but a substantial portion, typically about 10 to about 100 percent, e.g., about 50 to about 70 percent, of the sulfated solid oxide is directed to a zone or chamber where regeneration takes place. Although it is not essential in this embodiment, this regeneration zone would typically contain heat exchange surfaces for convenient extraction of heat from the system. A reducing gas comprising carbon monoxide is admitted at or near the bottom of this chamber, and the off gas from this regeneration zone, which comprises at least one of sulfur dioxide, elemental sulfur, and hydrogen sulfide and mixtures thereof, is directed to a sulfur recovery unit. At least a portion, e.g., a substantial portion of the regenerated solid oxide is then directed back to the combustion zone. The regeneration off gas may be directed to a conventional sulfur recovery unit, such as a Claus unit or a sulfuric acid plant, but for applications where the total amount of sulfur to be recovered is less than about 10 tons/day, a liquid phase redox process, preferably based on iron chemistry, may be more economical than a Claus unit. A hydrogenation reactor, to hydrogenate any $SO_2$ in the regeneration off gas to $H_2S$, may be needed to purify the feed to a liquid phase sulfur recovery unit. The regeneration off gas will typically contain enough excess reducing gas to drive the hydrogenation. The tail gas from the sulfur recovery unit can be fed back into the combustor, and then may be directed over the solid oxide to recover any unrecovered sulfur from the tail gas and to recover fuel value from any excess reducing gas. If the tail gas contains appreciable amounts of reducing gases, for example, greater than about 10 volume % total of hydrogen, carbon monoxide or hydrocarbons, it may be more economical to recycle a portion of the tail gas to the regeneration or desulfation zone, along with makeup reducing gas.

Current circulating fluid bed combustors are operated at about 1,550° F. to about 1,600° F. in part, because that is an effective temperature for $SO_x$ uptake by limestone ($CaCO_3$). The solid oxides of this invention, typically promoted magnesium aluminates, are effective for $SO_x$ capture at much lower temperatures, as low as 1,050° F., although preferably over about 1,100° F. to 1,150° F. Solid oxide lifetime will be maximized by operation at temperatures below about 1,500° F., but carbon combustion may become undesirably slow at temperatures below about 1,200° F. The typical range of operation for this embodiment is therefore about 1,200° F. to about 1,550° F., e.g., about 1,300° F. to about 1,400° F.

Non-limiting examples of reducing gases useful for regeneration of solid oxides according to the present invention include carbon monoxide, optionally combined with other gases effective for regeneration of the solid oxide, such as, hydrogen, hydrocarbons, or as synthesis gas, separately, in mixtures, or in combination with other gases such as nitrogen and water vapor. Suitable carbon monoxide containing gas streams include purity carbon monoxide, synthesis gas with water removal as needed, synthesis gas without water removal, and gas produced by the substoichiometric combustion of coal, coke, or hydrocarbons.

Synthesis gas may be produced by steam reforming or partial oxidation of coal, coke, or hydrocarbons. Synthesis gas as used here is a mixture of carbon monoxide and at least one of $H_2$, $H_2O$, $CO_2$, and possibly other gases such as $N_2$. The synthesis gas is typically produced by heating a carbon containing material, such as coal, petroleum coke, or hydrocarbons, such as methane, typically mixed with steam at temperatures over about 1,300° F., which results in the pyrolytic decomposition of the carbon containing material. The gas mixture produced by combusting carbon containing material under oxygen-deficient conditions is also included in this definition. Some representative reactions in synthesis gas formation are shown below.

$CH_4 + H_2O \rightarrow CO + 3 H_2$ (VII)

$C + H_2O \rightarrow CO + H_2$ (VIII)

$CO + H_2O \rightarrow CO_2 + H_2$ (IX)

$CH_4 + 1.5 O_2 \rightarrow CO + 2 H_2O$ (X)

During regeneration of the solid oxide, the temperature is generally maintained between about 400° F. and about 1,400° F., e.g., between about 900° F. and about 1,300° F., e.g., between about 1,050° F. and about 1,300° F. The pressure is generally maintained at about 0.1 to about 10 atmospheres, e.g., about 0.5 to about 5 atmospheres, e.g., about 1 to about 3 atmospheres. The reducing gas stream is generally directed over the solid oxide at a gas hourly space velocity (GHSV) of about 10 to about 20,000 $hr^{-1}$, e.g., about 20 to about 1800 $hr^{-1}$, e.g., about 50 to about 1000 $hr^{-1}$.

Regeneration of the solid oxide provides an off-gas stream, comprising at least one of hydrogen sulfide, sulfur dioxide, elemental sulfur and mixtures thereof, which may be directed to a sulfur plant for recovery of sulfur, e.g., a Claus plant. The off-gas stream may also contain water vapor, other sulfur compounds, and unconverted reducing gas.

Regeneration gases, such as, for example, carbon monoxide, are typically used at a rate yielding about 75 to about 1,000%, specifically about 90 to about 400%, more specifically about 100 to about 300% of the stoichiometric requirement of the regeneration gases.

As mentioned above, a mixture of regeneration gases is effective in this invention, e.g., carbon monoxide may be combined with other gases that are also effective to regenerate the solid oxide, such as hydrogen, to modify the energy required for regeneration of the sulfur oxide-containing material. For example, at 1,200° F., carbon monoxide produces an exothermic regeneration of the sulfur oxide-containing material, while hydrogen produces an endothermic regeneration of the solid oxide. Carbon monoxide and hydrogen can be mixed or combined in various proportions to produce a regeneration of the sulfur oxide-containing material that varies from more exothermic than a hydrogen only regeneration (using a carbon monoxide-rich reducing gas) to more endothermic than a carbon monoxide only regeneration (using a hydrogen-rich reducing gas), as desired. Carbon monoxide could also be combined with other gases that are effective to regenerate the solid oxide to achieve the same result. Carbon monoxide could also be combined with inert gases, if desired. In a similar fashion, synthesis gas provides carbon monoxide combined with one or more of $H_2$, $H_2O$, $CO_2$, and possibly other gases such as $N_2$. In the practice of this invention, water vapor may be included in the reducing gas.

The regeneration gas may be injected into the bed of sulfated solid oxide in multiple locations in the bed of sulfated solid oxide, for example, the regeneration gas may be injected in at least two, e.g., in at least three, e.g., in at least four, e.g., in at least five levels located successively longitudinally through the bed. Each of the injection locations may also independently comprise at least one, e.g., at least two, e.g., three or more injection points at each successive level in the bed of sulfated solid oxide. An embodiment of the regeneration gas injection system includes a process wherein the sulfated solid oxide referred to herein is contained in a bed and wherein the regeneration gas is contacted with the sulfated solid oxide by injecting through at least one injection point located on each of a plurality of different levels located longitudinally through the bed of solid oxide. The regeneration gas may be directed to all of the injection points on all of the levels simultaneously. Alternatively, the regeneration gas may be directed, using a suitable control system, to selected injection points or to all of the injection points on selected levels, for example, the regeneration gas could be directed first to some or all of the injection points located at the level closest to the exit of the bed, then sequentially to some or all of the injection points located on levels away from the bed exit. An embodiment of this control scheme is one where the flow of regeneration gas is individually controlled through the injection points. An equivalent to the above described system of injection points would be a comparable system of gas exit points at multiple locations throughout the bed.

The process of this invention may be heat integrated with other processing units, such as a Claus plant or other processing units. In addition to this external heat integration, the process of this invention, as mentioned herein may include internal heat integration, such as heaters for the regeneration gas and for the gas to be treated along with coolers for the treated gases and any coolers associated with the sulfur condensers used in this process.

This invention can be used to advantage with the catalyst being disposed in any conventional reactor-regenerator system, in ebullating catalyst bed systems, in systems which involve continuously conveying or circulating from one bed of solid oxide to another, fixed bed systems and the like. Typical of the circulating catalyst bed systems are the conventional moving bed and fluidized bed reactor-regenerator systems. Both of these circulating bed systems are conventionally used in hydrocarbon conversion, e.g., hydrocarbon cracking.

The form and the particle size of the solid oxide are not critical to the present invention and may vary depending, for example, on the type of solid oxide system employed. Non-limiting examples of the shapes of the solid oxide for use in the present invention include balls, pebbles, spheres, extrudates, channeled monoliths, microspheres, pellets or structural shapes, such as lobes, pills, cakes, powders, granules, and the like, formed using conventional methods, such as extrusion or spray drying. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized systems, it is preferred that the major amount by weight of the particles have a diameter in the range of about 10 microns to about 250 microns, more preferably about 20 microns to about 150 microns. With regard to solid combustion zones, it is preferred that the particles be greater than about 150 microns in size.

The solid oxide useful in this invention typically has a surface area (by the conventional B.E.T. method) in the range of about 5 $m^2$/gm. to about 600 $m^2$/gm., e.g., about 15 $m^2$/gm. to about 400 $m^2$/gm., e.g., about 20 $m^2$/gm. to about 300 $m^2$/gm.

Non-limiting examples of suitable solid oxides for use in the present invention include the porous solids, alumina, silica, silica-alumina, natural and synthetic zeolites, activated carbon, spinels, clays and combinations thereof. Gamma ($\gamma$) alumina, chi-eta-rho ($\chi$, $\eta$, $\rho$) alumina, delta ($\delta$) alumina, and theta ($\theta$) alumina are particularly useful as solid oxides and supports because of their high surface areas.

While alpha ($\alpha$) alumina and beta ($\beta$) alumina can be used as solid oxides herein, they are not as effective as gamma, chi-eta-rho, delta and theta alumina. One or more oxides of other metals can also be used as solid oxides, either alone or in combination with alumina or as spinels, such as, for example, bismuth, manganese, yttrium, antimony, tin, Group IA metals, Group IIA metals, rare earth metals, and combinations thereof. Magnesium aluminates are particularly useful in the method of this invention. These may be magnesium or aluminum rich with magnesium aluminate spinels preferred. Lanthanum and cerium are preferred rare earth metals. Naturally occurring rare earths, such as in the form of baestenite, are also useful solid oxides. Elemental copper or copper compound solid oxides, can also be used. The copper oxide can be cuprous oxide ($Cu_2O$) and/or cupric oxide (CuO). Other copper compounds can be used, such as copper (II) sulfate, copper (II) acetate, copper (II) formate, copper (II) nitrate and/or copper (II) chloride. The solid oxide can also be a blend/mixture of high density and low density materials, such as of the above-identified metal oxides.

Also, a metal or metal oxide may be deposited on the solid oxide or may be used alone. The metal or metal oxide part of the solid oxide can be supported, carried and held on a refractory support or carrier material which also provides part of the solid oxide. The support controls the attrition and surface area characteristics of the solid oxide. The support typically has a surface area greater than about 10 $m^2$/g, e.g., from about 20 $m^2$/g to about 500 $m^2$/g. Suitable supports include, but are not limited to, silica, alumina, silica-alumina, zirconia, titania, thoria, kaolin or other clays, diatomaceous earth, boria, and/or mullite. The support can comprise the same material as the metal or metal oxide part of the solid oxide.

The solid oxide may be combined with a matrix or binder, including the supports mentioned above, e.g., alumina. The solid oxide may also be used without a matrix or binder. The support material may also be present in the bed containing the solid oxide in particles separate from the particles of the solid oxide. Also, optionally present in the bed containing the solid oxide may be particles of an inert material, wherein the term "inert" is used to represent materials that are less effective when used in the sulfation/desulfation cycles described herein.

The solid oxide can be impregnated or otherwise coated with at least one oxidizing catalyst or promoter that promotes the removal of nitrogen oxides, the oxidation of $SO_2$ to $SO_3$ in the presence of oxygen, and the removal of the sulfur compounds from the solid oxide. It is believed that $SO_3$ is more readily combined with the solid oxide than $SO_2$. One useful catalyst is ceria (cerium oxide). Another useful catalyst is platinum. Yet another useful catalyst is vanadium. Other catalytic metals, both free and in a combined form, preferably as an oxide form, can be used, either alone or in combination with each other or in combination with ceria and/or alumina, such as rare earth metals, metals from Group VIII of the Periodic Table, chromium, vanadium, rhenium, tungsten, silver, and combinations thereof. The promoter can comprise the same material as the solid oxide. An even distribution of the promoter may be helpful to achieve best results and to minimize solid oxide erosion.

Useful Group IA metals include lithium, sodium, potassium, rubidium, and cesium. Useful Group IIA metals include magnesium, calcium, strontium, and barium. Useful Group VIII metals are the Group VIII noble metals (the platinum family of metals) including ruthenium, rhodium, palladium, osmium, iridium, and platinum. Also useful are Group IB and Group IIB metals. The rare earth metals are also useful and are referred to as the lanthanides. Suitable rare earth metals include lanthanum, cerium, praseodymium, neodymium, samarium, europium, gadolinium, terbium, dysprosium, holmium, erbium, thulium, ytterbium, and lutetium. The promoter may be selected from the rare earth metals, the platinum group metals and mixtures thereof. Particularly good results are achieved when the promoter is cerium and/or platinum, with cerium giving outstanding results.

A second promoter, if present, may be selected from the metal or the metal oxide form of iron, nickel, titanium, chromium, manganese, cobalt, germanium, tin, bismuth, molybdenum, antimony, vanadium and mixtures thereof. The second promoter may be selected from iron, nickel, cobalt, manganese, tin, vanadium and mixtures thereof. Additional metals may be also incorporated into the solid oxide. For example, the solid oxide may include small or trace amounts of additional metals or metal oxides, such as lanthanum, iron, sodium, calcium, copper, and titanium.

The specific amounts of the promoters included in the solid oxide, if present at all, may vary widely. The first promoter may be present in an amount between about 0.001% to about 20% by weight, calculated as elemental metal, of the solid oxide, and the second promoter may be present in an amount between about 0.001% to about 10% by weight, calculated as elemental metal, of the solid oxide. The solid oxide may include about 0.1% to about 20%, e.g., about 0.2% to about 20%, e.g., about 0.5% to about 15%, by weight of rare earth metal, calculated as elemental metal. Of course, if a platinum group metal is employed in the solid oxide, very much reduced concentrations (e.g., in the parts per thousand to parts per million (ppm) range) are employed. If vanadium is included as the second promoter, it may be present in an amount of about 0.01% to about 7%, e.g., about 0.1% to about 5%, e.g., about 0.5% to about 2% by weight of vanadium, calculated as elemental metal.

The promoters may be associated with the solid oxide using any suitable technique or combination of techniques; including, for example, impregnation, coprecipitation, ion-exchange and the like, well known in the art. Also, the promoters may be added during synthesis of the solid oxide. Thus, the promoters may be an integral part of the solid oxide or may be in a phase separate from the solid oxide (e.g., deposited on the solid oxide) or both. These metal components may be associated with the solid oxide together or in any sequence or by the same or different association techniques. Cost considerations favor the preferred procedure in which the metal components are associated together with the solid oxide. Impregnation may be carried out by contacting the solid oxide with a solution, e.g., an aqueous solution, of the metal salts.

It may not be necessary to wash the solid oxide after certain soluble metal salts (such as nitrate, sulfate or acetate) are added. After impregnation with the metal salts, the solid oxide can be dried and calcined to decompose the salts, forming an oxide in the case of a nitrate, sulfate or acetate.

The above-mentioned solid oxides are generally discussed in U.S. Pat. No. 4,692,318 which issued to Tolpin et al. on Sep. 8, 1987. This patent is hereby incorporated by reference herein.

In one general aspect, the present invention may involve use of a solid oxide which is represented by the following empirical formula

where the atomic ratio of x to y ranges from about 0.1 to about 10 and where z is at least as required to accommodate the valances of the Mg and Al components of the solid oxide. This solid oxide may have the spinel structure and may contain at least one of the promoters described above.

Metal-containing spinels according to the above empirical formula that are useful in the present invention include the alkaline earth metal spinels, in particular magnesium (first metal) and aluminum (second metal)-containing spinel. Other alkaline earth metal ions, such as calcium, strontium, barium and mixtures thereof, may replace all or a part of the magnesium ions. Similarly, other metal ions, such as iron, chromium, vanadium, manganese, gallium, boron, cobalt, Group IB metals, Group IVA metals, Group IVB metals, the platinum group metals, the rare earth metals, Te, Nb, Ta, Sc, Zn, Y, Mo, W, Tl, Re, U, Th and mixtures thereof, may replace all or a part of the aluminum ions, e.g., only a part of the aluminum ions.

The metal-containing spinels useful in the present invention may be derived from conventional and well known sources. For example, these spinels may be naturally occurring or may be synthesized using techniques well known in the art. Thus, a detailed description of such techniques is not included herein. One process for preparing the solid oxide is presented in U.S. Pat. No. 4,728,635, the specification of which is incorporated by reference herein.

The Group IA, IIA, IB metals, Group IIB metals, Group IVA metals, Group IVB metals, and Group VIII metals referred to herein are those listed in the Periodic Table of the Elements in the *Handbook of Chemistry and Physics* (61st Edition).

Free magnesia and/or alumina (i.e., apart from the alkaline earth metal containing spinel) also may be included in the present solid oxide, e.g., using conventional techniques. For example, in one embodiment, the solid oxide preferably includes about 0.1% to about 30% by weight of free magnesia (calculated as MgO).

As mentioned above, potential solid oxides are magnesia rich, magnesium aluminate spinels. One example of such a spinel is a commercial magnesia rich, magnesium aluminate spinel containing 0 to 100 wt. % excess magnesia, 5 to 15 wt. % cerium, and 1 to 5 wt. % vanadium. These solid oxides are substantially described in U.S. Pat. Nos. 4,790,982 to Yoo et al.; 4,472,267 to Yoo et al.; and 4,469,589 to Yoo et al. The disclosures of U.S. Pat. Nos. 4,790,982; 4,472,267; and 4,469,589 are herein incorporated by reference. In general, the magnesium aluminate spinels useful in the present invention may be prepared by methods which are conventional and well known in the art.

EXAMPLES

A number of reducing gases were tested to determine their effectiveness for solid oxide regeneration and their effect on the heat balance of the regeneration of the solid oxide.

EXAMPLES 1–3

The oxidative sorption of sulfur oxides on commercially available magnesia rich, magnesium aluminate spinels was accomplished via the following procedure. Samples of solid oxide were sulfated using an automated, down-flow, packed reactor. Six grams of sample were packed into a quartz reactor (9 mm inner diameter) which was heated to 1,200° F. using a radiant furnace. The temperature of the bed was controlled using a centrally mounted thermocouple. The catalyst was sulfated under the conditions given in the following table.

TABLE 1

| Process | Gas Flow Rate cc/min | Gas Composition | Time, min |
|---|---|---|---|
| Sulfation | 500 | 1% $SO_2$, 4% $O_2$, bal. $N_2$ | 300 |

The sulfated sample was removed from the reactor and stored in a capped glass vial.

The thermochemistry described in Table 2 was obtained with a differential scanning calorimeter (DSC). The materials used were solid oxides with adsorbed sulfur oxides prepared as described above. The measurements of the thermal characteristics of the materials tested consisted of reducing the material in hydrogen, propane and carbon monoxide. The heats of reaction were monitored with the DSC and associated computer interface, and the heats of reaction were calculated with the aid of the computer interface. The experiments listed in Table 2 were conducted at 1,200° F. using 15 cc/min reducing gas and about 0.1 g sulfated solid oxide.

Table 2 lists the results of the thermochemistry experiments to determine the effect of different reducing gases on the regeneration energy of a sulfur oxide-sorbed solid oxide. The heat of reaction of the sulfated commercial magnesia rich, magnesium aluminate spinel with hydrogen at 1,200° F. was +10.5 kcal/mol $SO_3$ desorbed (positive numbers represent an endothermic reaction and negative numbers represent an exothermic reaction). The heat of reaction of the sulfated commercial magnesia rich, magnesium aluminate spinel with propane at 1,200° F. was +47.4 kcal/mol $SO_3$ desorbed. The heat of reaction of the sulfated commercial magnesia rich, magnesium aluminate spinel with carbon monoxide at 1,200° F. was −16.5 kcal/mol $SO_3$ desorbed. Also listed in Table 2, are calculated values for the capacity of the above described solid oxide for containing removed sulfur oxides under adiabatic conditions with hydrogen, propane and carbon monoxide as reducing gases (Maximum $SO_3$ uptake is about 60 wt. % on this catalyst).

TABLE 2

| Example Number | Reductant | Desulfation energy kcal/mol $SO_3$ | Adiabatic Bed Capacity, % |
|---|---|---|---|
| (1) | Hydrogen | 10.5 | 42 |
| (2) | Propane | 47.4 | 9.2 |
| (3) | Carbon Monoxide | −16.5 | 60 |

Positive regeneration energies represent endothermic reactions and negative regeneration energies represent exothermic reactions.

Under the adiabatic conditions typical in a commercial unit, carbon monoxide provides a significant change in the thermodynamics of solid oxide regeneration, which provides a substantial increase in the adiabatic capacity of the solid oxide bed for $SO_3$.

EXAMPLES 4-5

In order to evaluate the effect of temperature on the desorption rate of sulfur oxides from the solid oxide, a set of measurements were performed with a microbalance reactor. The sulfation of commercially available magnesia rich, magnesium aluminate spinel quadralobes (1/20 inch nominal size) was accomplished in the same manner as for Examples 1 through 3 above. A sulfur oxide uptake of 62 wt. % as $SO_3$ on these solid oxides was observed, calculated as weight increase from sulfation divided by the original weight of the solid oxide before sulfation.

The time required for desulfation of 80 wt. % of the sulfur compounds from the solid oxide using hydrogen and carbon monoxide as reducing gases was obtained using the microbalance reactor. The materials used were sulfated solid oxides prepared as described above. The microbalance reactor was heated to the desired temperature with a flow of nitrogen. The sample (approximately 50 mg) was then placed on a quartz pan which was suspended from the microbalance arm. After providing sufficient time for thermal equilibration, the gas flow was switched to the reducing gas to be tested and the weight of the sample recorded as a function of time at a constant reducing gas temperature and flow rate. From the weight loss profile, the time required for 80% desulfation was computed for each temperature. The temperatures investigated included 1,100° F. and 1,200° F. The reducing gases investigated included hydrogen and carbon monoxide. The reducing gas flow rate was about 100 cc/min.

Table 3 lists the results of the desulfation rate experiments for removal of 80 wt. % of the sulfur compounds from the solid oxide.

TABLE 3

| Example Number | Reductant | Desulfation Time for 80 wt. % $SO_x$ Removal minutes | |
|---|---|---|---|
| | | 1,100° F. | 1,200° F. |
| (4) | Hydrogen | 25.4 | 9.6 |
| (5) | Carbon monoxide | 18.5 | 2.5 |

In the temperature range of interest, the regeneration energy for the solid oxide using carbon monoxide was unexpectedly found to be exothermic and carbon monoxide regenerated the solid oxide slightly faster than hydrogen.

We claim:

1. A process where a solid oxide is used to remove sulfur oxides wherein said solid oxide is regenerated with a reducing gas and off gas is passed to a Claus sulfur recovery process comprising:

(a) introducing an oxygen containing gas and a tail-gas containing sulfur compounds therein into an incinerator under conditions sufficient to convert substantially all of the sulfur to sulfur oxides;

(b) directing the gas containing sulfur oxides produced in step (a) from the incinerator into an absorber containing a solid oxide comprising a magnesium aluminate spinel operated under conditions sufficient to remove substantially all of the sulfur oxides from the gas and to thereby produce a sulfated solid oxide and a substantially sulfur oxide free gas, which sulfur free gas is released from said absorber;

(c) ceasing contact between the sulfur oxide containing gas and the solid oxide after the solid oxide has become substantially loaded with said oxides;

(d) regenerating the solid oxide by contacting the solid oxide with a reducing gas stream consisting essentially of carbon monoxide at a temperature of about 1,050° to about 1,400° F., a pressure of about 0.1 to about 10 atmospheres, and a gas hourly space velocity of the reducing gas stream from about 500 to about 20,000 $hr^{-1}$, thereby forming (1) an off gas comprising at least one of sulfur dioxide, hydrogen sulfide and elemental sulfur, and (2) a regenerated solid oxide; and (e) directing the off gas into a sulfur recovery process for converting the sulfur compounds in the off gas substantially to elemental sulfur.

2. The process according to claim 1, in which the solid oxide is a magnesium aluminate spinel, said spinel further comprising at least one promoter selected from cerium, vanadium and mixtures thereof.

3. A process where a solid oxide is used in a solid fuel combustion zone to remove sulfur oxides wherein said solid oxide is regenerated with a reducing gas and off gas is passed to a sulfur recovery process comprising:

(a) selecting a magnesium aluminate as the solid oxide, said magnesium aluminate further comprising at least one promoter selected from the group of cerium, vanadium and mixtures thereof;

(b) adding the solid oxide to the combustion zone where solid fuel is combusted and thereby produces a combustion gas and an ash;

(c) contacting the combustion gas with the solid oxide at conditions effective to remove substantially all of the sulfur oxides from the combustion gas and to thereby produce a sulfated solid oxide;

(d) passing the sulfated solid oxide from the combustion zone;

(e) directing at least a portion of the sulfated solid oxide into a regeneration zone;

(f) regenerating the sulfated solid oxide in the regeneration zone by contacting the solid oxide with a reducing gas consisting essentially of carbon monoxide at a temperature of about 1,050° to about 1,400° F., a pressure of about 0.1 to about 10 atmospheres and a gas hourly space velocity of the reducing gas stream from about 500 to about 20,000 $hr^{-1}$ under conditions sufficient to allow the sulfur compounds thereon to be released, thereby forming a regenerated solid oxide and an off gas comprising at least one of sulfur dioxide, hydrogen sulfide, elemental sulfur and mixtures thereof, in an amount sufficient to be removed by a sulfur recovery process;

(g) adding at least a portion of the regenerated solid oxide into the combustion zone; and (h) directing the off gas into a sulfur recovery process.

4. A process for removing sulfur-containing gases from a gas stream with a solid sorbent bed which comprises:

(i) converting substantially all of the sulfur-containing gases in the gas stream to sulfur oxides whenever substantially all of the sulfur-containing gases in the gas stream are not sulfur oxides;

(ii) directing the gas stream containing the sulfur oxides to said solid sorbent bed operated at a temperature of from about 1050° F. to about 1,400° F., a pressure of from about 0.1 atmospheres to about 10 atmospheres, a gas hourly space velocity of the gas stream from about 500 GHSV to about 20,000 GHSV, said solid sorbent bed comprising a magnesium aluminate spinel for sorbing substantially all of the sulfur oxides on the solid sorbent as sulfur compounds and forming a substantially sulfur oxide free stream; and (iii) regenerating the solid sorbent bed by contacting the bed with a reducing gas consisting essentially of carbon monoxide under operating conditions for releasing the sorbed sulfur compounds and forming (1) an off-gas comprising at least one of sulfur dioxide, hydrogen sulfide and elemental sulfur and (2) a regenerated solid sorbent; said operating conditions being a temperature of from about 1050° F. to about 1,400° F., a pressure of from about 0.10 atm to about 10 atm, and a gas hourly space velocity of the reducing gas of 10 to about 20,000 $hr^{-1}$.

5. The process of claim 4 wherein the gas stream is from an FCC regenerator, coal or oil-fired plant or process heat furnace, or the tail gas from a Claus plant.

6. The process of claim 4 wherein the temperature in step (iii) is from about 1,050° F. to about 1,300° F.

\* \* \* \* \*